Feb. 20, 1940.  J. W. BARCUS  2,190,857
FLEXIBLE DRIVING CONNECTION
Original Filed Aug. 19, 1936  2 Sheets-Sheet 1
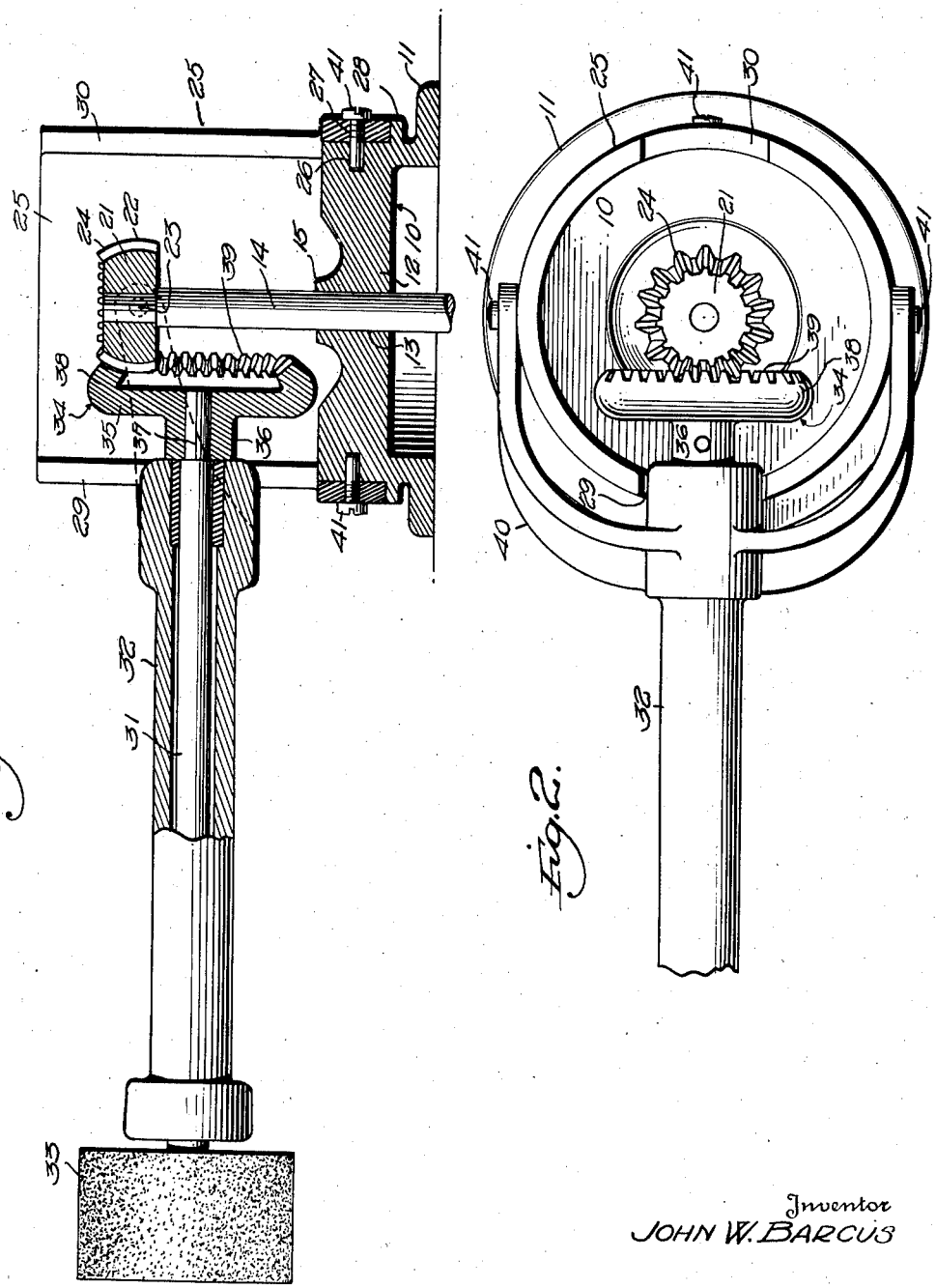
Inventor
JOHN W. BARCUS Feb. 20, 1940.  J. W. BARCUS  2,190,857
FLEXIBLE DRIVING CONNECTION
Original Filed Aug. 19, 1936  2 Sheets-Sheet 2
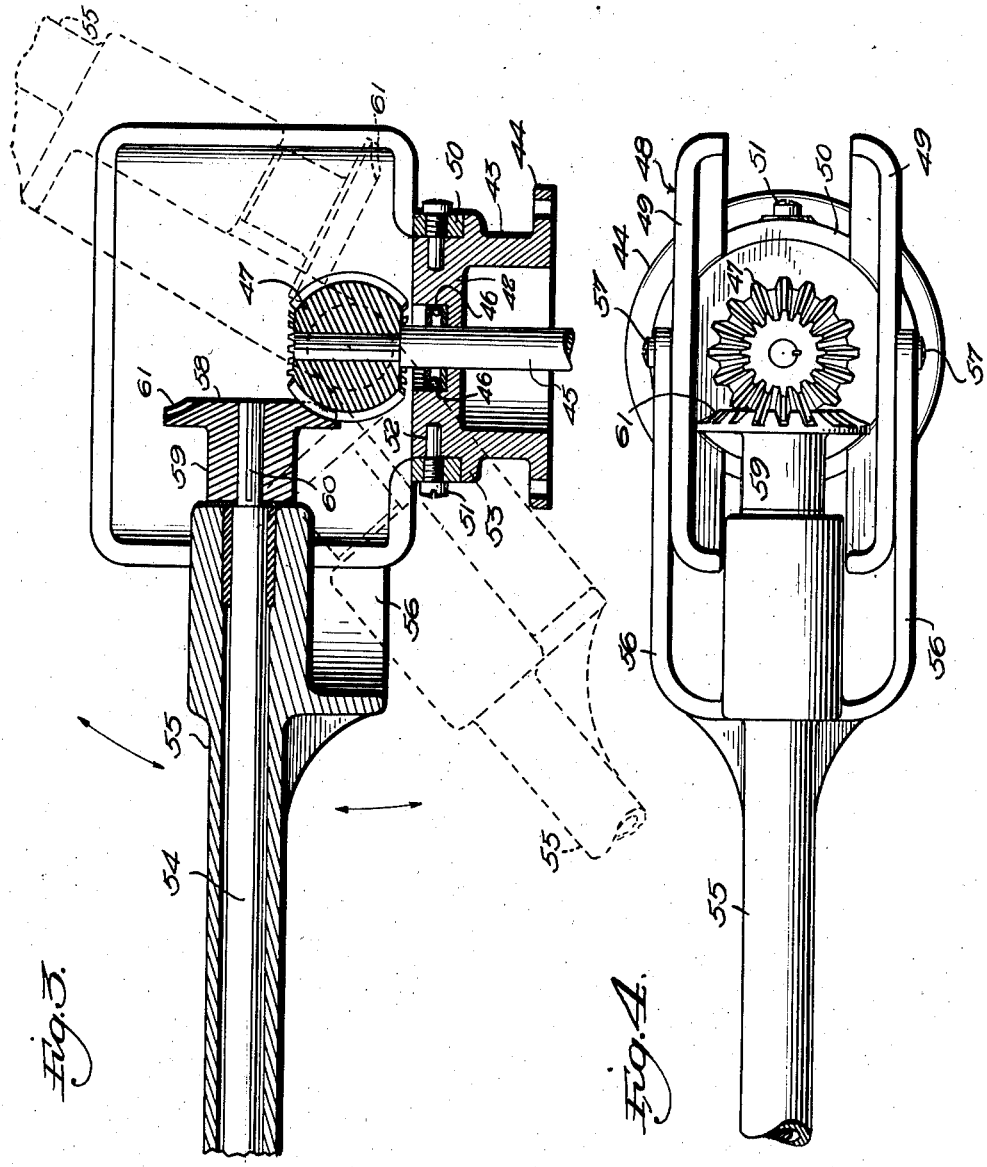
Inventor
JOHN W. BARCUS
By
Attorney Patented Feb. 20, 1940

2,190,857

UNITED STATES PATENT OFFICE 2,190,857

FLEXIBLE DRIVING CONNECTION

John W. Barcus, Baltimore, Md., assignor, by mesne assignments, to Baltimore Development Corporation, Baltimore, Md., a corporation of Maryland Application August 19, 1936, Serial No. 96,859
Renewed July 11, 1939

4 Claims. (Cl. 74—385)

This invention relates to flexible driving connections.

Numerous forms of flexible driving connections have been devised, most of such devices being in the form of universal joints. While numerous of these devices have been satisfactory in operation, they are open to the objection that the driving and driven shafts are adapted to assume positions with the axes arranged at only limited angles with respect to each other. For example, the axis of the driven shaft may be maintained in alignment with the axis of the driving shaft, or it may be moved with respect thereto up to an angle of approximately 45°. It is impracticable with most constructions to increase the angularity between the driving and driven shafts, and ordinarily, power losses increase as the angularity of the shafts is increased. Moreover prior devices of this character make no provision for reversing the direction of rotation of the driven shaft with respect to the drive shaft.

An important object of the present invention is to provide a positive flexible driving connection between a drive shaft and a driven shaft wherein the latter is adapted to assume a position greatly in excess of 45° from the axis of the drive shaft without introducing additional power losses.

A further object is to provide a mechanism of the character referred to wherein the rotation of the driven shaft is accomplished positively and with minimum lost motion.

A further object is to provide a device of the character referred to wherein the direction of rotation of the driven shaft may be reversed.

Other objects and advantages of the invention will become apparent during the course of the following description.

In the drawings I have shown two embodiments of the invention. In this showing

Figure 1 is a central vertical sectional view, parts being shown in elevation;

Figure 2 is a plan view;

Figure 3 is a central vertical sectional view of a modified form of the device, parts being broken away, and Figure 4 is a plan view of the same.

Referring to Figures 1 and 2 the numeral 10 designates a suitable form of supporting structure which may be provided with a lower annular flange 11 to facilitate securing the support on any suitable supporting surface. The support 10 comprises a horizontal base 12 having an opening 13 extending vertically therethrough for the reception of a drive shaft 14, the base 12 preferably being provided with an upstanding sleeve portion 15 forming a bearing for the shaft 14.

At its upper end, the shaft 14 carries a substantially spherical gear 21 having teeth 22 lying in radial planes. The center of the spherical gear lies approximately at the point 23 (Fig. 1). The edges of the outer extremities of the teeth 22 are approximately parallel throughout their lengths, and the sides 24 of the teeth are preferably curved or bulged whereby the teeth increase in thickness toward their extremities. This construction is advisable in order to reduce lost motion in the device, as will become apparent.

A sleeve 25 has its lower end rotatable about the periphery of the support 12, the sleeve 25 being concentric with the axis of the shaft 14. The base 12 is provided with an annular guide groove 26 receiving the inner cylindrical ends of guide screws 27. These screws permit free rotation of the sleeve 25, but prevent upward movement thereof. If desired, the support 10 may be provided with an annular shoulder 28 rotatably supporting the lower end of the sleeve 25. The sleeve 25 may extend upwardly to the height indicated in Figure 1 and is provided at opposite sides with vertical slots 29 and 30, preferably extending downwardly approximately to the level of the top of the base 12.

A driven shaft 31 is rotatable in a sleeve 32 and has any suitable form of working implement, such as a brush 33, secured to its outer end. The shaft 31 supports at its inner end a gear indicated as a whole by the numeral 34. This gear includes a radial portion 35, at the center of which is formed an integral hub 36 keyed to the shaft 31 as at 37. The gear 34 further includes a conical flange 38 having gear teeth 39 formed in its edge portion and meshing with the gear teeth 22. The diameter of the toothed portion of the gear 34 is preferably materially larger than the diameter of the sphere about which the gear 21 is generated, to minimize the number of teeth of the two gears which will be in mesh. To provide proper clearance, the opposite sides of the gear teeth 39 are bowed with respect to each other as indicated in Figure 1. It will be apparent that after the teeth 39 pass the common plane of the axes of the shafts 14 and 31, the angularity of the gear teeth 39 with respect to the teeth 22 increases, thus rendering necessary the bowed shape of the teeth 39, except in cases where the gear 34 is materially greater in size than the gear 21.

The sleeve 32 is provided with a yoke 40, the ends of the arms of which are pivotally connected as at 41 to opposite sides of the sleeve 25. The pivot pins 41 have a common axis which is coincident with the center point of the sphere about which the gear 21 is generated. Obviously, therefore, the structure which carries the gear 34 is adapted to swing vertically while maintaining the teeth of the two gears in proper mesh. Moreover, since the sleeve 25 is concentric with the axis of the shaft 14, the supporting structure for the gear 34 is adapted to be swung about the axis of the shaft 14.

A somewhat modified form of the invention is shown in Figures 3 and 4 of the drawings. In such form of the invention, a supporting base 42 is provided with a depending skirt portion 43 terminating at its lower end in a suitable attaching flange 44. A drive shaft 45 extends axially through the base 42 and the latter may be provided with anti-friction bearings 46 for the shaft 45. The upper end of the shaft 45 is provided with a spherical gear 47, which is preferably identical with the gear 21, and need not be described in detail.

A guard 48 is arranged above the base 42 and comprises an elongated generally rectangular upper structure formed of a pair of side members 49 formed integral with a lower sleeve 50. Guide pins 51 are carried by the sleeve 50 and have cylindrical inner ends operating in an annular guide groove 52 formed in the periphery of the base 42. The base structure is preferably provided with an annular bearing flange 53 engaging the lower extremity of the sleeve 50.

A driven shaft 54 is rotatable in a sleeve 55 provided with a yoke 56 the arms of which are pivotally supported as at 57 with respect to the outer faces of the cage members 49. The pivot means 57 have a common axis coincident with the center point of the spherical gear 47.

A gear 58 has a hub portion 59 keyed as at 60 or otherwise secured to the inner end of the shaft 54. The gear 58 is provided with teeth 61 meshing with the teeth of the spherical gear 47. The gear 58 is in the general nature of a bevel gear except that the individual teeth 61 are curved to correspond to the spherical curvature of the teeth of the gear 47.

The operation of the form of the invention shown in Figures 1 and 2 is as follows:

The shaft 14 is driven from any suitable source of power, as will be apparent. The gear 38 has its teeth 39 meshing with the gear teeth 22 much after the fashion of an internal bevel gear, except that the teeth of both gears are curved in radial planes through the respective axes of the two shafts. The teeth 22 have their outer surfaces curved about the center point 23 and the teeth 39 obviously are similarly curved.

Since the supporting structure for the shaft 31 is pivoted on an axis passing through the center 23, it will be apparent that the sleeve 32 and shaft 31 may swing vertically within reasonable limits without affecting the meshing of the two sets of gear teeth. It also will be apparent that the sleeve 25, which supports the pivot pins 41, is rotatable about the axis of the shaft 14, thus permitting the sleeve 32 and shaft 31 to swing horizontally. The sleeve and shaft referred to accordingly are universally supported to permit the brush 33, or other implement carried by the shaft 31, to be moved to any desired position within reasonable limits.

If a reversal of the direction of rotation of the shaft 31 is desired, the sleeve 32 may be swung upwardly and over the top of the gear 21 to bring the teeth 39 into engagement with the right hand side of the gear 21, as viewed in Figure 1. The slot 30 is provided to accommodate the sleeve 32 when the latter is swung to the reversing position referred to.

The form of the invention shown in Figures 3 and 4 is substantially identical in operation with the form just described. The principal distinction lies in the fact that the gears 47 and 58 mesh after the fashion of two external bevel gears, and the supporting structure for the shaft 54 is adapted to swing upwardly and downwardly about the axis of the pivot pins 57 or horizontally by virtue of the rotation of the sleeve 50 about the axis of the shaft 45. Thus the shaft 54 is universally supported for movement to the desired point of operation. The dotted line portion of the parts toward the left in Figure 3 indicates one possible position of the driven shaft mechanism, thus indicating the extent to which the driven shaft may be moved beyond a position at 90° with respect to the drive shaft 54.

As in the previously described form of the invention, the direction of rotation of the shaft 54 may be reversed, as desired. For example, the driven shaft structure may be swung to the position indicated in dotted lines at the right hand side of Figure 3 to bring the teeth of the gear 58 into mesh with the opposite side of the gear 47. Thus each form of the invention embodies a driven shaft which may be rotated in either direction, and it will be obvious that the driven shaft is universally supported regardless of its direction of rotation.

As previously stated, conventional universal joints permit only limited angular movement of the axis of the driven shaft with respect to the axis of the drive shaft. In the present construction, the driven shaft may be driven in a position at 90° with respect to the axis of the drive shaft, and may be varied considerably in its angular position. Moreover, the meshing gears provide a positive driving connection in which frictional losses are reduced to a minimum and are substantially uniform throughout the range of movement of the driven shaft. Obviously, the mechanism is not limited in its use to the driving of a brush 33, but may be employed for driving a variety of tools or implements such as cutter heads, grinding stones, etc.

It is to be understood that the forms of the invention herewith shown and described are to be taken as preferred examples of the same, and that various changes in the shape, size and arrangement of parts may be resorted to without departing from the spirit of the invention or the scope of the subjoined claims.

I claim:

1. A flexible driving connection comprising a pair of shafts, a spherical gear carried by one of said shafts, a gear carried by the other shaft and meshing with said spherical gear, a bearing device for said first named shaft having a cylindrical portion provided with an annular groove, a support having a cylindrical portion surrounding said first named cylindrical portion and provided with inwardly projecting elements engaging in said annular groove, and means connecting said second named shaft to said support for swinging movement about an axis perpendicular to said first named shaft and intersecting the center of said spherical gear.

2. A flexible driving connection comprising a pair of shafts, a spherical gear carried by one of said shafts, a gear carried by the other shaft and meshing with said spherical gear, a bearing device for said first named shaft having a cylindrical portion provided with an annular groove, a support having a cylindrical portion surrounding said first named cylindrical portion and provided with inwardly projecting elements engaging in said annular groove, a bearing for said second named shaft, a yoke carried by said bearing, and means connecting the arms of said yoke to said support for swinging movement about an axis perpendicular to the axis of said first named shaft and intersecting the center of said spherical gear.

3. In a flexible driving connection of the character described, a driving shaft, a driven shaft, a spherical gear carried by said driving shaft, a gear of the bevel type carried by said driven shaft and meshing with said spherical gear, a support for the driving shaft, a rotatable support for the driven shaft mounted concentrically with said driving shaft, means for reversing the angular direction of rotation of the driven shaft comprising bearing means for said driven shaft pivotally connected to said rotatable support for guiding said driven shaft for movement about an axis perpendicular to the axis of the driving shaft and intersecting the center of a segment of said spherical gear, the gears thereby being moved out of meshing relationship on one side of said driving shaft and into meshing relationship at a diametrically opposite point.

4. In a flexible driving connection, a driving shaft, a driven shaft, a spherical gear carried by one of said shafts, a gear of the bevel type carried by the other shaft for meshing engagement with said spherical gear, a support for the driven gear movable concentrically of said driving shaft, and bearing means for said driven shaft pivotally connected to said support coincident with but perpendicular to the axis of said driving shaft, whereby upon swinging movement of said bearing means the said gears may be moved out of meshing relationship on one side of said driving shaft and into meshing relationship at a diametrically opposite point.

JOHN W. BARCUS.